July 15, 1952   S. D. MOXLEY   2,603,042
APPARATUS FOR GRINDING AND GAUGING OBJECTS SUCH AS NUTS
Filed June 26, 1950   5 Sheets-Sheet 2

INVENTOR
Stephen D. Moxley
BY Cameron, Kerkam + Sutton
ATTORNEYS

July 15, 1952 S. D. MOXLEY 2,603,042
APPARATUS FOR GRINDING AND GAUGING OBJECTS SUCH AS NUTS
Filed June 26, 1950 5 Sheets-Sheet 3
Fig. 3.
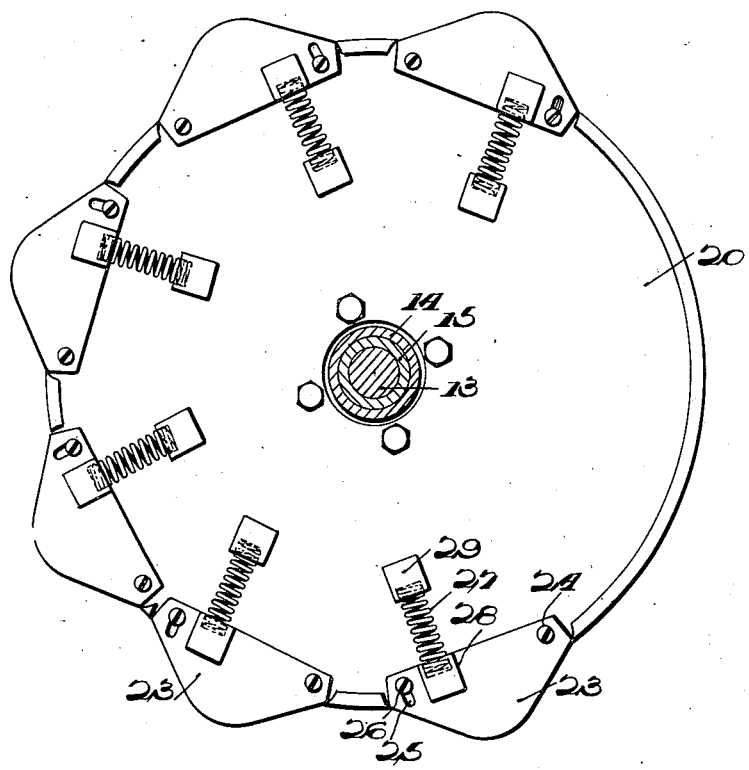
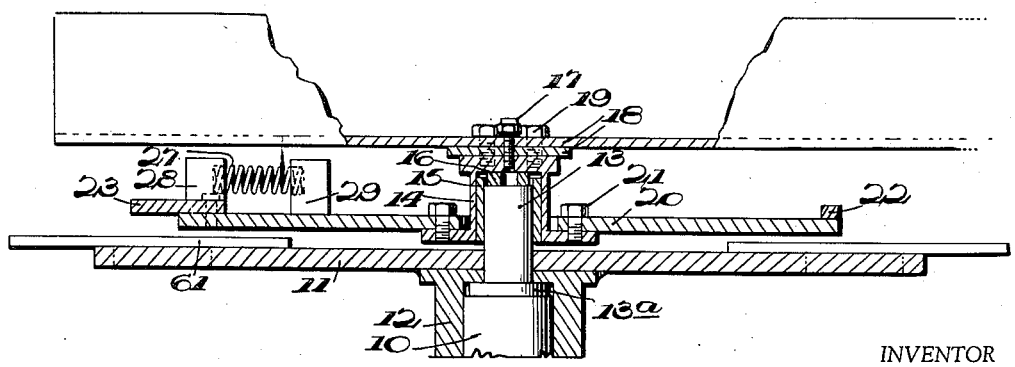
Fig. 4.
INVENTOR
Stephen D. Moxley.
BY
Cameron, Kerkam + Sutton
ATTORNEYS

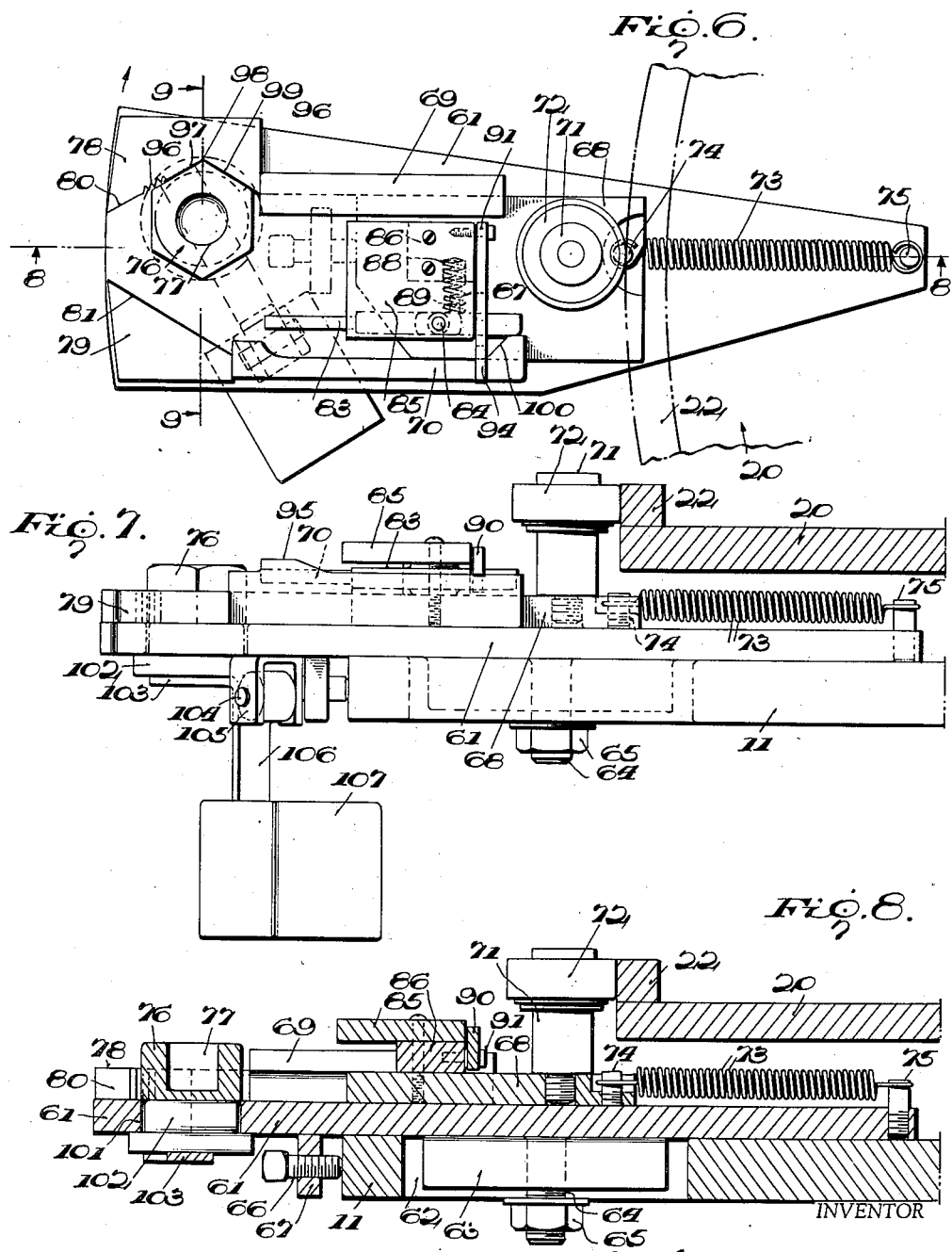

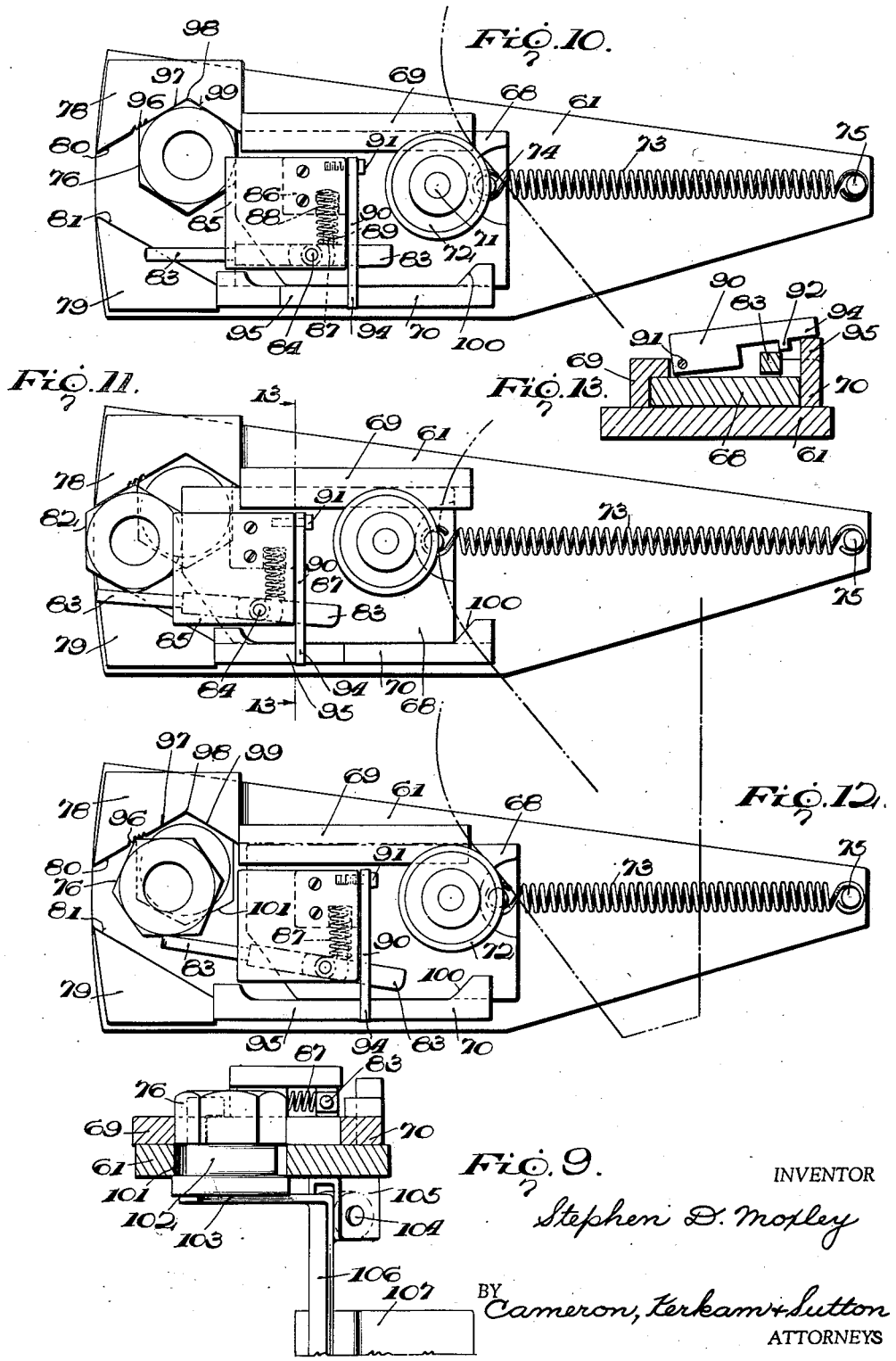

Patented July 15, 1952

2,603,042

UNITED STATES PATENT OFFICE 2,603,042

APPARATUS FOR GRINDING AND GAUGING OBJECTS SUCH AS NUTS

Stephen D. Moxley, Birmingham, Ala., assignor to American Cast Iron Pipe Company, Birmingham, Ala., a corporation of Georgia Application June 26, 1950, Serial No. 170,317

15 Claims. (Cl. 51—108)

1

This invention relates to apparatus for automatically performing one or more work operations in succession on different faces or peripheral sections of a work piece, the work piece being automatically moved from one work station to another and also rotated so as to present different faces at successive work stations. Apparatus embodying the invention is particularly suited for handling articles of polygonal configuration having flat faces to be presented to the tools at the successive work stations, but it is to be understood that the invention is not restricted to this particular application and that it can be used for any other desired purpose.

In the manufacture of various articles, it is often necessary to perform one or more of a number of different operations on the surface of the article, such as grinding, polishing, marking, machining, gauging and so on. Especially in the case of small metal objects produced in large quantities, it is desirable to perform such operations by machine because manual handling of the objects is difficult and the work is apt to be inaccurate and its cost out of proportion to the value of the finished article. A typical example of such problems is found in the manufacture of small cast metal objects such as nuts which for convenience will be referred to hereinafter for the purpose of illustrating the invention. After casting, various imperfections may exist such as rough spots, swells, fins, and projections at mold gates which must be removed before the cast object is finished and ready for the market. Nuts are normally cast in the drag or bottom part of the mold, and imperfections such as those mentioned above seldom occur on the top or bottom faces of the nut but do appear on its side faces; moreover, the nuts are seldom cast undersize. Inasmuch as the dimension between the side faces of the nut is standardized in relation to wrench sizes, such imperfections and/or any substantial oversizing must be removed.

One of the objects of the invention is to provide an improved apparatus for automatically performing a desired work operation or operations in succession on different peripheral portions of a work piece.

Another object is to provide improved apparatus of the above type which is simple and relatively inexpensive in construction, which reduces labor costs, and which is reliable and foolproof as well as automatic in operation.

A further object is to provide improved apparatus of the above type for grinding cast articles to finished size in which improved means are provided for controlling and limiting the extent of grinding so as to produce the desired final size.

A still further object is to provide improved apparatus as characterized in the preceding object in which the size of the finished article is automatically gauged before it is discharged from the machine.

Another object is to provide such improved apparatus in which the article, if still oversized after passing through the machine, is automatically left in the machine for another pass.

Another object is to provide apparatus of the type characterized above for handling articles of polygonal configuration and having improved means for turning the article so as to present its faces in succession at a series of working stations.

Another object is to provide apparatus of the above type for handling articles of polygonal configuration and having improved means operative at each working station for advancing the article toward the working tool and for limiting the advance of the article to a predetermined position corresponding with the desired final size.

Other objects will appear hereinafter as the description of the invention proceeds.

The general organization of machines embodying the invention comprises a work table or equivalent support rotating, preferably continuously, on a substantially vertical axis, and surrounded by a plurality of circumferentially spaced work stations the number and spacing of which as well as the kind of tool employed at each station being governed by the number and kind of operations to be performed on the work. As a rule provision is also made for a loading station for the unfinished work and for a discharge station for the finished work. Non-rotating cam means of less diameter than the table are located within the periphery of the table to provide a cam track having a number of high points, one corresponding to each work station. The work piece is placed by hand or otherwise in a holder mounted on the periphery of the table and rotating therewith in a path between the cam means and the tools at the successive work stations. At each work station, a radially movable part of the holder is actuated by a high point of the cam means to advance the work piece into a position in which a section of its surface is engaged by the appropriate tool. As the holder moves beyond the work station, the work advancing member leaves the high point of the cam and is retracted, this retraction being utilized to rotate the work piece in its holder so as to present a different section of its surface to the tool at the next working station.

The finished work piece is automatically discharged from the machine at the discharge station. Where sizing operations are performed on the work, the work holder preferably includes gauging means which prevent the automatic discharge of an oversized or otherwise imperfect work piece so that it remains in the holder and passes again through the machine unless removed manually by the operator.

It will be seen from the foregoing general description that it is possible to employ only one work holder and to finish only one work piece per revolution of the machine. However, in order to increase the capacity and production of the machine, it will usually be desirable to employ a number of work holders distributed conveniently around the periphery of the table. In this case the location of the work stations or the number and spacing of the work holders or both can be adjusted in any desired manner so that only one, or any appropriate number less than all, of the tools is or are working at any one instant, thus reducing the load on the machine and also vibration and wear and consequently the power required to operate it.

The accompanying drawings show an embodiment of the invention designed to grind the surfaces of a hexagonal cast iron nut or like hexagonal object, but it is to be expressly understood that said drawings are for purposes of illustration only and are not to be construed as a definition of the limits of the invention, reference being had to the appended claims for this purpose.

In the drawings:

Fig. 3 is an enlarged plan view showing the cam means and the relation thereof to the work table;

Fig. 4 is a section on the line 4—4 of Fig. 3;

Fig. 5 is a sectional detail of a suitable grinding mechanism;

Fig. 6 is a plan view of one of the work holders;

Fig. 7 is a side view of the work holder;

Fig. 8 is a section on the line 8—8 of Fig. 6;

Fig. 9 is a section on the line 9—9 of Fig. 6; and

Figs. 10–13 illustrate different positions of the work holder mechanism, Fig. 13 being a section on the line 13—13 of Fig. 11.

Figure 2:
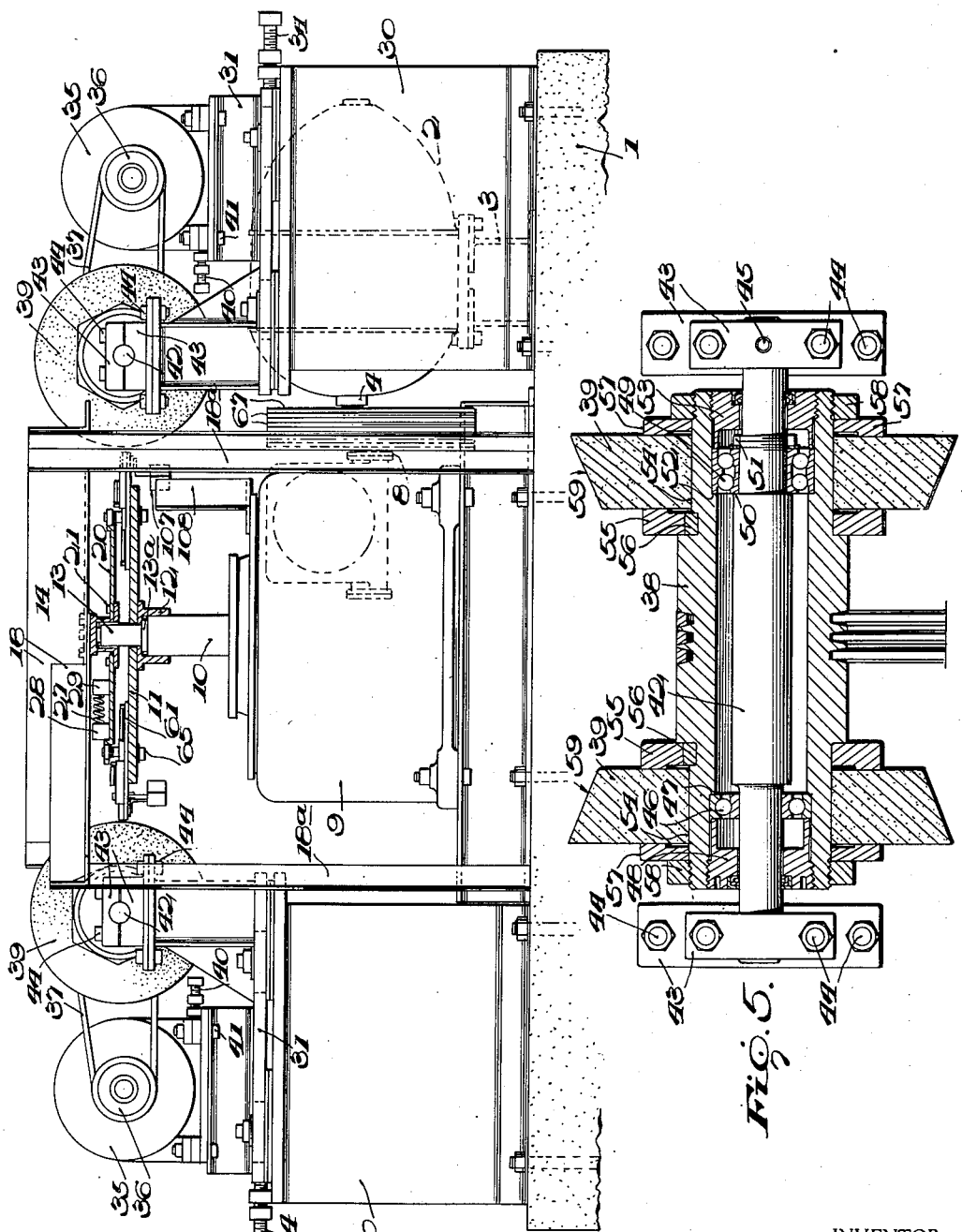
Fig. 2 is a side view of the complete machine, partly in section.

The machine is mounted on any suitable support here shown as comprising a concrete base indicated generally at 1 in Fig. 2. A work table of any suitable construction and material is rotatably mounted on the base 1 in any suitable manner and is driven at any appropriate speed by any suitable means such as an electric motor and reduction gearing. In the form shown, an electric driving motor 2 is mounted on a support 3 secured to the base 1, the shaft 4 of the motor carrying a sheave 5 driving a multiple V-belt 6 which in turn drives a sheave 7 on the end of a drive shaft 8 of a suitable reduction gear unit housed in a gear box 9 that is mounted on the base 1. The driven shaft 10 projects from the top of the gear box and rotates a work table 11 in any suitable manner as by means of a cap 12 surrounding and suitably keyed to the upper end of the shaft, the table 11 being secured to the cap piece in any suitable manner as by welding. In order to provide a bearing for the upper end of the shaft 10, a stub shaft 13 may be employed, said stub shaft having an enlarged head 13a (Fig. 4) resting on the top of the shaft 10 inside the cap 12 and extending upwardly through openings in the cap 12 and table 11 into a stationary cap bearing 14 provided with a suitable bushing 15 and bearing plate 16 and lubricated by a pressure fitting 17. The bearing cap 14 can be rigidly supported by any desired superstructure, here shown as comprising a frame formed of angles 18 screwed or bolted to the bearing cap as indicated at 19 and having their ends supported by uprights 18a.

The work table 11 may suitably comprise a substantially circular metal plate or disk secured to the cap 13 as described above and carries one or more work holders as described hereinafter. Mounted above the work table is a non-rotating cam means preferably comprising a substantially circular metal plate or disk 20 secured to the cap bearing 14 in any suitable manner as by means of bolts 21. The details of the cam means are shown more clearly in Figs. 3 and 4. In order to provide a continuous track for the cam-actuated work holder mechanism hereinafter described, the edge of the cam plate 20 is preferably flanged upwardly at 22 between work stations, and at each work station the flange 22 is cut away and replaced by a cam member 23 providing a high point for actuation of said mechanism to be described, the edges of the cam members 23 forming continuations of and connecting the sections of the flange 22. Preferably the cam elements 23 are yieldably mounted for a purpose to be described, and this is accomplished without interrupting the continuity of the cam track by pivoting the leading end of each cam member to the cam plate 20 at 24 and by providing at its opposite end a slot 25 fitting over a pin 26 secured to the cam plate 20. Said cam elements are normally maintained outwardly at the limit of pivotal movement permitted by the slots 25 (Fig. 3) by suitable resilient means such as compression springs 27 interposed between spring seats 28 and 29 secured respectively to the cam elements 23 and to the cam plate 20, but are capable of swinging inwardly on their pivots 24 in case of a force sufficient to overcome the resistance of the springs 27.

In finishing hexagonal nuts, six work stations are provided each of which comprises a grinding wheel adapted to engage and finish one face of a nut as it is moved past the work stations in succession by the rotating work table 11. For convenience, the six grinding wheels thus required may be mounted and driven in pairs so that one grinding unit provides two work stations. In the form shown, three such grinding units are mounted on box-like supports 30 secured to the base 1, each unit comprising a supporting base 31 which can be adjustably locked to the top of the support 30 by suitable means such as slots 32 in the base plate and locking bolts 33 passing through the slots and secured to the support 30. Any suitable means such as adjusting screws 34 can be provided for close adjustment of the position of each base 31 on its support 30.

Each unit comprises a driving motor 35 mounted on the base 31 and driving a sheave 36 and a multiple V-belt 37 which in turn drives a sheave or sleeve 38 carrying a pair of grinding wheels 39. The motor is preferably adjustable relative to the base 31 by means of adjusting screws 40 and is secured in adjusted position by bolts 41. Fig. 5 illustrates a suitable arrangement for mounting and driving a pair of grinding wheels. A spindle 42 is mounted at its ends in pillow blocks 43 secured together and to the base 31 by suitable bolts or screws 44. One end of the spindle 42 is preferably pinned to its pillow blocks to prevent rotation as indicated at 45. The sleeve 38 surrounds the spindle 42 and is mounted rotatably thereon in any suitable manner. In the form shown, a suitable ball bearing 46 (Fig. 5) surrounds one end of the spindle and supports one end of the sleeve thereon, the outer bearing race being locked between an internal shoulder 47 of the sleeve and a suitable nut 48 threaded in the end of the sleeve. The other end of the spindle carries a double ball bearing 49 serving to support the associated end of the sleeve and at the same time to take axial thrust in both directions. The inner bearing race is locked against a shoulder 50 of the spindle by means of a nut 51 threaded on the outer end of the spindle, and the outer bearing race is locked between an internal shoulder 52 of the sleeve and a suitable nut 53 threaded in the end of the sleeve.

Figure 1:
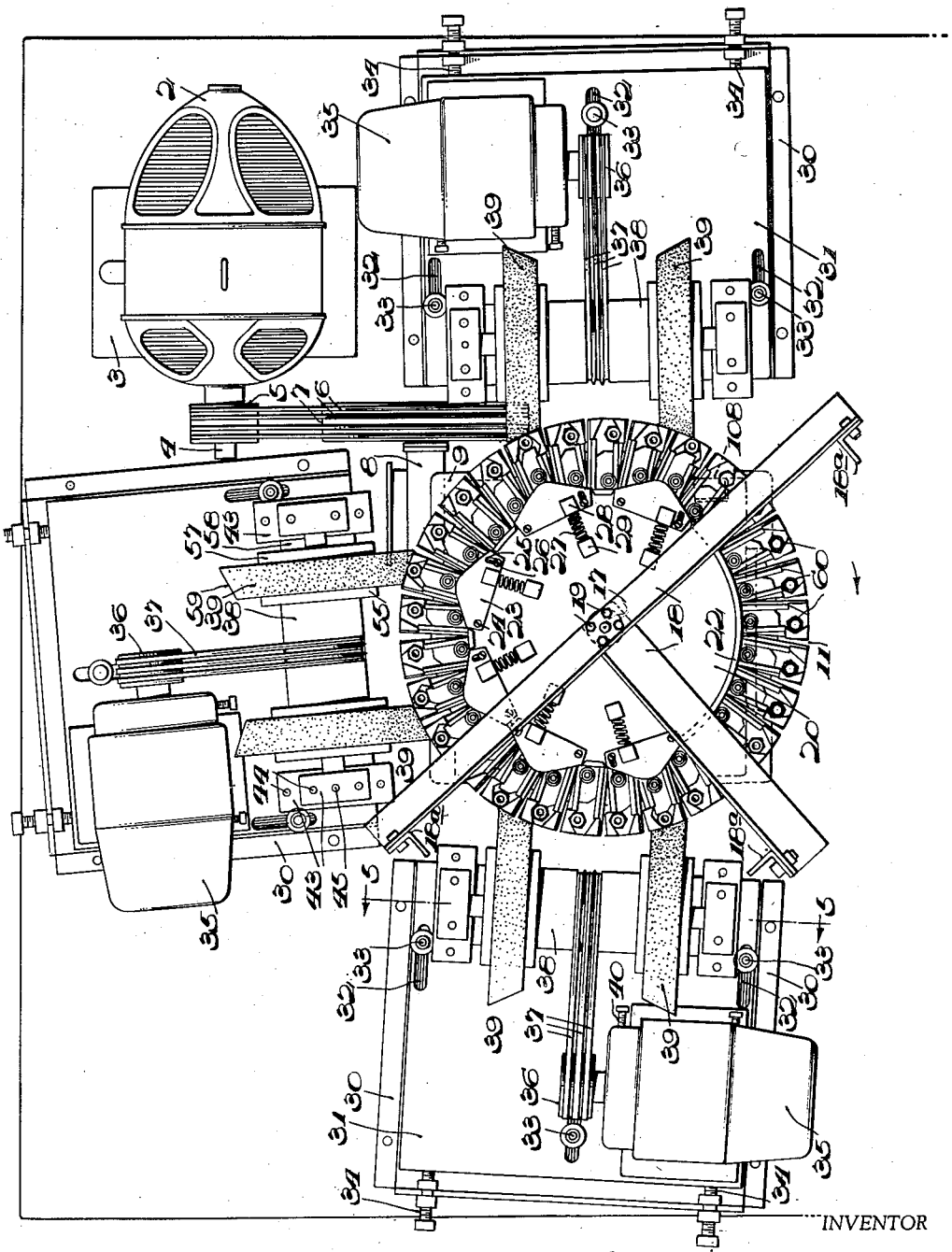
Fig. 1 is a plan view of the complete machine.

The two grinding wheels 39 are mounted on the sleeve 38 adjacent its opposite ends for rotation therewith. In the form shown, each end of the sleeve is reduced in external diameter as shown at 54 to receive the grinding wheel which is held in position by means of an inner clamping ring 55 keyed at 56 to the spindle and outer clamping ring 57 held in place by a nut 58 screwed on the outer end of the sleeve. Each grinding wheel has its grinding face 59 dressed at such an angle that it is substantially tangent to a circle concentric with the work table 11 as shown in Fig. 1.

The peripheral margin of the work table carries one or more work holders which rotate with the table in a path between the cam means and the grinding wheels described above. Preferably the work holders are placed closely side by side as indicated generally at 60 in Fig. 1, twenty-nine such work holders being shown in this figure. The number of work holders that can be distributed conveniently around the periphery of the work table will of course vary, depending on the diameter of the table and the size of the holders.

Each work holder comprises a base assembly or structure that is rigidly secured to the table and is provided with a substantially radial guideway or track along which slides a work advancing member actuated by the cam track 22, 23. In the form shown in Figs. 6-8, the individual base assemblies each comprise a suitable base plate 61 that is secured in any suitable manner to the periphery of the table 11 in a substantially radial position. For example, the table may be provided with a plurality of radial slots 62 and the base plates 61 with depending keys 63 engaging in the slots 62, each base plate being locked in position by means of a bolt 64 projecting below the table and a nut 65. The radial position of each base plate 61 can be nicely adjusted by means of a set screw 66 threaded in a depending lug 67 and engaging the periphery of the table. Each work holder also comprises a radially movable work advancing member 68 engaging and operated by the cam track 22, 23 to advance the work at each working station as the table 11 rotates, said member 68 being mounted to slide on the base plate 61 between guides 69 and 70 secured to the edges of the base plate and extending over the top of the slide 68. For cam actuation, each slide member 68 carries at its inner end a stud 71 having thereon a cam roller 72 which is maintained in engagement with the cam track 22, 23 by suitable resilient means such as a spring 73 extending between a pin 74 on the inner end of the slide 68 and a pin 75 on the inner end of the base plate 61.

In the operation described herein by way of example, the work pieces take the form of hexagonal cast iron nuts 76 provided with a central cavity 77 adapted to be threaded after the exterior faces of the nut have been finished. These nuts are placed in the work holders by hand or by any suitable feeding mechanism in advance of the slides 68, which are normally retracted by the springs 73 (Figs. 6-8). When rotation of the table 11 brings a cam roller 72 to one of the working stations, however, it rides up the surface of one of the cam elements 23 and advances its slide 68 to advance a work piece 76 toward one of the grinding wheels 39. Suitable means are provided for limiting the advance of the nut at a position where the face of the nut will not be ground to less than the desired final size, and also for positioning the nut so that one of its hexagonal faces protrudes from the work holder (Fig. 11) into engagement with the grinding wheel and substantially tangent to a circle concentric with the table 11. Preferably these positioning means comprise a pair of jaw members 78 and 79 located at the outer end of the work holder and having their jaw faces 80 and 81 spaced to permit one side 82 of the nut to protrude slightly beyond the work holder, said faces being disposed at angles corresponding to the sides of the nut which adjoin its protruding side 82 so that the nut is wedged between them to limit its radially outward movement and to hold it firmly during the grinding operation. This wedging effect is assured by proportioning the parts so that the cam members 23 yield somewhat against their positioning springs 27 as the cam rollers 72 pass over the high portions of the cam members.

After the working face 82 has passed by a grinding wheel 39, the cam roller 72 rides down the opposite side of the cam element 23 and the work advancing member 68 is accordingly retracted by its spring 73 to the position shown in Figs. 6-8. This retraction is utilized to rotate the nut in the holder by an amount such that the next advance of the slide 68 at the next working station will project the next side of the nut beyond the jaws 78, 79. Such rotation of the nut is accomplished by means carried by the slide 68 and urged resiliently into engagement with one side of the nut in its advance position, said means being subsequently retracted inwardly with the slide 68 and also moving transversely so as to move the side of the nut inwardly and toward the opposite jaw and thus to retract the nut in the jaws 78, 79 and to turn the nut between them.

As illustrated in Figs. 6-8, the aforesaid combined inward and transverse movements of the nut retracting and turning means can be provided simply by pivoting a finger 83 on the slide 68 and resiliently urging said finger to swing on its pivot in such a direction that its outer end moves transversely into engagement with the side of the nut. For example, the finger 83 may be pivoted at 84 between the top of the slide 68 and a plate 85 that is secured to a filler block 86 and carried thereby above and in spaced relation to the top of the slide 68. The outwardly projecting end of the finger 83 passes by one side of the nut as the slide 68 moves outwardly at a work station, and swings around the pivot 84 into engagement with the side of the advanced nut by virtue of a compression spring 87 having one end seated in a recess 88 in the filler block 86 and the other end fitting over a pin 89 on the inner end of the finger 83.

Suitable means are provided for preventing transverse movement of the forward end of the finger 83 until it has moved outwardly alongside the nut, and for subsequently returning the retracted finger to the proper position for advance at the next working station. As shown, the finger is held in this position as the slide advances by a suitable latch member 90 pivoted at 91 to the rear face of the filler block 86 and extending over the inner end of the finger 83, said member being provided with a depending catch 92 (Fig. 13) which normally holds the finger 83 in a radial position. As the slide 68 moves outwardly, therefore, the outer end of the finger 83 is held to one side of the nut (Fig. 10) and the finger remains in this position as the slide continues to advance and engages and advances the nut to the position shown in Fig. 11. The outer end 94 of the latch meanwhile rides on the guide 70, and near the outer end of this guide it is lifted by an inclined cam piece 95 (Fig. 7) to release the finger 83 which then is swung into engagement with the side of the advanced nut (Fig. 11).

On subsequent retraction of the slide 68, the finger 83 bears first on the corner of the nut as shown in Fig. 11 and by virtue of the combined inward and pivotal movement of the finger, it tends to turn the nut in a counterclockwise direction as shown in Fig. 12. Preferably turning of the nut is facilitated by means of serrations 96 formed on the jaw face 80 adjacent the corner of the nut and thus holding said corner as a pivotal point about which the nut is turned. To limit the turning of the nut, the jaw face 80 extends inwardly beyond the serrations as indicated at 97 to the apex 98 of a notch formed by its intersection with an angularly extending jaw face 99, the angle between the faces 97 and 99 corresponding to the angle between adjoining sides of the nut and said faces 97, 99 being disposed so as to limit the turning of the nut to one sixth of a rotation. When this rotation has been completed, the nut is again in the position shown in Fig. 6. The further retraction of the slide 68 causes the finger 83 to wipe past the turned nut while depending catch 92 of latch member 90 rests on top of finger 83, and as the slide reaches its innermost position the inner end of the finger 83 engages a cam face 100 of the guide 70 and is swung back to its radial position. The latch 90 then drops into a horizontal position and depending catch 92 holds the finger in its radial position until it is acted upon by cam 95 during the next advance of the slide.

Thus when the nut has passed all six grinding wheels 39 and its six faces have all been ground, it is left nestling in the V-shaped notch 97, 98, 99 ready for discharge from the machine. Preferably suitable means are provided so that the nut will be automatically discharged if it has been properly finished, but will not be discharged in case it is still oversized or still has imperfections projecting from any of its six sides. For this purpose the discharge of the nut is preferably effected through a hexagonally-shaped discharge opening 101 in the bottom of the base plate 61, this opening being gauged to pass only nuts having dimensions within the desired final limits. During the travel of the nut past the six working stations, it is prevented from dropping through the discharge opening by a suitable support 102 located in said opening, but at the discharge station the support 102 is moved by suitable cam means so that properly finished nuts are discharged. For convenience, the support 102 is preferably counterweighted to maintain it normally in the opening 101 as shown in Figs. 8 and 9, and to this end the support is mounted on the arm 103 of a lever pivoted at 104 in a lug 105 depending from the base plate 61, another arm 106 depending from the pivot axis and carrying a counterweight 107 of sufficient size to counterbalance the weight of the support 102 and of the nut 76 thereon.

Thus the support 102 is maintained in the opening 101 until the discharge station is reached and discharge of unfinished nuts is prevented. At this station, however, a discharge cam 108 (Figs. 1 and 2) engages and lifts the counterweight 107, thereby lowering the support 102 and discharging the finished nut through the opening provided it is within the limits of size and shape of the gauged opening. However, an imperfect nut that will not pass through the gauged opening remains in the holder and may be removed at the loading station and discarded, or left in the holder for another pass through the machine.

Imperfections in nut castings, such as swells and projections resulting from breaking off the fins or gates, normally occur only in the upper one-third of the height of each nut as it is cast. It is therefore preferable to limit the height of jaw members 78 and 79, as indicated in Figs. 7, 8 and 9, to only about half the height of the nuts 76 so that, when the nuts are placed in the holders, the imperfections are above the jaws and thus do not contact the jaw faces 80 and 81 which determine the positions of the nuts during the grinding operations. In the event that a nut may have an imperfection extending throughout the height of one of its side faces, uniform positioning of the nut at the successive grinding stations may be achieved by so placing the nut in the holder at the loading station that the imperfect side face is presented to the first grinding wheel. In those infrequent cases where full length imperfections occur on more than one face, the nut will not be properly ground in one cycle of the machine, and may be either removed and discarded manually by the operator at the loading station or left in the machine for another cycle.

It will be seen that the operation of the machine is completely automatic, it being necessary only to drop the nuts one by one into the moving holders at the loading point which can be done manually or by means of any suitable feeding device. Thereafter the sides of the nut are automatically presented in succession to the tools at the successive work stations, the advance of the nut toward the tool being positively and accurately limited so as to prevent overgrinding. All manual handling of the nuts during the actual work operations is eliminated, with the resultant advantages of decreased labor costs, reduction of hazard to personnel, and increased production.

The machine itself is simple and relatively inexpensive in construction and reliable and foolproof in operation. Complicated and delicate work on tool feeding mechanisms and work rotating mechanisms is replaced by a simple cam-actuated slide carrying a resiliently-urged finger and cooperating with a pair of fixed jaws, and there is little if any need for adjustment, repair or replacement of parts. However, any one or more of the work holders can be removed if necessary without in any way interfering with the operation of the remaining units or of the machine as a whole.

As previously stated, the maximum number of work holders will vary depending on the diameter of the table and the size of the work, but any desired lesser number of work holders can be employed. In the case of objects having flat sides, the diameter of the table should preferably be large in relation to the size of the work pieces so that the finished sides will not be rounded to an objectionable extent, so that the maximum number of holders that can be used will be correspondingly large. Preferably the angular spacing between the work stations should not be a multiple of the angular spacing between the work holders, so that not all the tools are working at the same time, thus reducing the work load on the driving motor and vibration and wear of the machine. By adjusting these relative angular spacings and the location of the work stations, wide variations in the timing and sequence of operations at the successive work stations are obviously possible. In the embodiment particularly described above, advantage has been taken of this flexibility of arrangement to mount pairs of grinding stones on common shafts each with a single driving motor. It will be seen in Fig. 1 that the center lines of the three grinding units are not 90° apart but either slightly more or slightly less, and that only one stone of each unit is in operation at any instant so that the work load on the driving motor of each grinder unit is never more than that of one stone. Various other arrangements can be devised by those skilled in the art to meet the conditions existing in each case.

While only one embodiment of the invention has been described and illustrated in the drawings, it will be understood that the invention is not restricted to this embodiment but is susceptible of a variety of mechanical expressions, and that various changes can be made in the form, details of construction, and arrangement of the parts without departure from the spirit of the invention. Reference should therefore be had to the appended claims for a definition of the limits of the invention.

What is claimed is:

1. In apparatus of the class described comprising a rotatable work support for successively presenting different surfaces of work pieces to the action of a plurality of tools located at work stations spaced circumferentially around said support, the combination with said work support of a plurality of work holders mounted on and distributed around the periphery of said support each including a radially movable work-advancing member for moving a work piece from a non-workable position within said holder to an advanced position wherein one surface of the work piece is workable by the tools at said work stations, means for moving said work-advancing members radially outwardly to advance the work pieces at each work station and for retracting said work-advancing members between successive work stations including a plurality of cam elements equal in number to said stations disposed about the axis of said support in relatively fixed positions corresponding to those of said work stations and cooperating cam follower elements mounted on said work-advancing members, each of said work holders comprising means for holding the work piece against turning while it is in the advanced position and means actuated by retraction of said work-advancing member for turning the work piece in its holder, whereby different surfaces of the work piece are presented to the tools at successive work stations.

2. Apparatus as defined in claim 1, each of said work holders including means for limiting the advance of the work piece by said work-advancing member to a predetermined position and each of said cam elements being yieldably mounted so as to absorb forces tending to produce outward movement of said members which may be exerted after the work pieces have been advanced to said predetermined positions.

3. Apparatus as defined in claim 2 comprising cam means extending between adjacent cam elements and forming therewith a continuous cam track around the axis of rotation of said support, each of said cam elements being pivotally mounted adjacent one end and including yieldable means urging its other end outwardly and normally maintaining it in position in said track.

4. In apparatus of the class described comprising a work support movable in a horizontal plane for successively presenting different surfaces of work pieces to the action of a plurality of tools located at work stations spaced along the path of movement of said support, the combination with said work support of a plurality of work holders mounted on and movable with said support each including a horizontally reciprocable work-advancing member for moving a work piece from a non-workable position within said holder to an advanced position wherein one surface of the work piece is workable by the tools at said work stations, means for moving said work-advancing members in one direction to advance the work pieces at each work station and for retracting said members in the opposite direction between successive work stations, each of said holders comprising means for holding the work piece against turning while it is in the advanced position, means actuated by retraction of said work-advancing member for turning the work piece in its holder so as to present different surfaces to the tools at successive work stations, a discharge opening in the bottom of said holder of such size and shape as to pass a finished work piece and a work piece support normally closing said opening, and means at a discharge station for moving said work piece support away from said opening and permitting a finished work piece to discharge from its holder by gravity through said opening.

5. Apparatus as defined in claim 4, said means at the discharge station comprising a cam engaging and moving said work piece support.

6. Apparatus as defined in claim 5, said work piece support being pivotally mounted on said work holder and having a depending arm operated by said cam at the discharge station.

7. Apparatus as defined in claim 6, said depending arm including a weight normally maintaining said work piece support in position to close said opening and adapted to engage said cam at the discharge station.

8. In apparatus of the class described, the combination with a rotatable work table for successively presenting different surfaces of work pieces to the action of a plurality of tools located at work stations spaced around the circumference of said table of non-rotatable cam means located within the periphery of the table and having a plurality of high points one corresponding to each work station, a work holder secured to the periphery of said table and having a radially reciprocable work-advancing member engaging and operated by said cam means for moving a work piece from a non-workable position within said holder to an advanced position wherein one surface of the work piece is workable by the tool at each work station, said holder having means for limiting the radially outward movement therein of the work piece advanced by said member at each work station and for holding said work piece against turning while it is in the advanced position, a work piece rotating element mounted on said work-advancing member for movement radially therewith and transversely thereto, and means for moving said element transversely into engagement with the side of the work piece during the outward movement of said member and maintaining said engagement during a portion of the subsequent retraction of said member to turn said work piece in said holder as said member moves inwardly.

9. Apparatus as defined in claim 8, said element being pivotally mounted on said member, and resilient means carried by said member for swinging said element about its pivot transversely to the movement of said member and into engagement with said work piece.

10. Apparatus as defined in claim 9, including latch means on said member for holding said element against swinging movement in one direction under the influence of said resilient means, means on said holder engaging and releasing said latch means during the outward movement of said member, and means on said holder engaging and swinging said element in the opposite direction as said member is retracted to re-set said latch means.

11. In apparatus of the class described for handling work pieces of polygonal shape, the combination with a rotatable work table for successively presenting different sides of said work pieces to the action of a plurality of tools located at work stations spaced around the circumference of said table of non-rotatable cam means located within the periphery of the table and having a plurality of high points one corresponding to each work station, a work holder secured to the periphery of said table and having a radially reciprocable work-advancing member engaging and operated by said cam means for moving a work piece from a non-workable position within said holder to an advanced position wherein one side of the work piece is workable by the tools at said work stations, said holder having jaws spaced to permit one side of the advanced polygonal work piece to project outwardly therebetween for engagement with the tools at said work stations and having jaw faces disposed at angles corresponding to the sides of said work piece which adjoin said one side, said jaw faces being adapted to limit the advance of the work piece toward said tools to a predetermined position during the outward movement of said work-advancing member, and means carried by said holder for turning said work piece therein during the inward movement of said member.

12. In apparatus of the class described for handling work pieces of polygonal shape, the combination with a rotatable work table for successively presenting different sides of said work pieces to the action of a plurality of tools located at work stations spaced around the circumference of said table of cam means located at circumferentially fixed positions within the periphery of the table and having a plurality of high points one corresponding to each work station, a work holder secured to the periphery of said table and having a radially reciprocable work-advancing member engaging and operated by said cam means for moving a work piece from a non-workable position within said holder to an advanced position wherein one side of the work piece is workable by the tools at said work stations, said holder having a pair of jaws spaced to permit one side of the advanced polygonal work piece to project outwardly therebetween for engagement with the tools at said work stations and having jaw faces disposed at angles corresponding to the sides of said work piece which adjoin said one side, the face of one jaw extending inwardly beyond the position of the end of the adjacent side of the advanced work piece, work piece rotating means carried by said work-advancing member for movement radially therewith, and means for moving said work piece rotating means relatively to said work-advancing member into engagement with the side of the advanced work piece adjacent the other jaw and for maintaining said engagement during the inward movement of said work-advancing member so as to turn the work piece against said extended jaw face.

13. Apparatus as defined in claim 12, said extended jaw face having serrations adapted to engage and hold one corner of the work piece as the work piece is turned about said corner by said work piece rotating means.

14. Apparatus as defined in claim 12, said inwardly extending jaw face terminating in a V-shaped notch having an angle corresponding to the angle between adjoining sides of said work piece.

15. Apparatus as defined in claim 14, said work holder having a discharge opening in the bottom thereof of polygonal shape and size corresponding to a finished work piece, two adjoining sides of said opening being aligned with the faces of said notch.

STEPHEN D. MOXLEY.

REFERENCES CITED

The following references are of record in the file of this patent:

UNITED STATES PATENTS

| Number | Name | Date |
| --- | --- | --- |
| 570,367 | Beers | Oct. 27, 1896 |
| 839,740 | Embler | Dec. 25, 1906 |
| 1,205,696 | Beck | Nov. 21, 1916 |
| 1,389,308 | Jones | Aug. 30, 1921 |
| 1,408,916 | Wilcox | Mar. 7, 1922 |
| 2,396,941 | Corrigan | Mar. 19, 1946 |
| 2,546,504 | Head | Mar. 27, 1951 |

FOREIGN PATENTS

| Number | Country | Date |
| --- | --- | --- |
| 536,774 | Germany | Oct. 19, 1931 |